US007525038B2

(12) United States Patent
Yamada

(10) Patent No.: US 7,525,038 B2
(45) Date of Patent: Apr. 28, 2009

(54) EFFECT SYSTEM

(75) Inventor: Yasuyuki Yamada, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 64 days.

(21) Appl. No.: 11/800,437

(22) Filed: May 2, 2007

(65) Prior Publication Data

US 2007/0256549 A1 Nov. 8, 2007

(51) Int. Cl.
*G01P 3/00* (2006.01)
*G10H 1/02* (2006.01)

(52) U.S. Cl. ............................ 84/626; 84/622; 84/625; 84/659; 84/660; 84/662

(58) Field of Classification Search ....................... None
See application file for complete search history.

(56) References Cited

U.S. PATENT DOCUMENTS 3,499,094 A * 3/1970 Katsutoshi .................. 84/679
3,644,657 A * 2/1972 Miller ......................... 84/705
3,647,928 A * 3/1972 Turner ......................... 84/708
4,337,460 A * 6/1982 Smith et al. ............ 340/384.72
7,373,210 B2 * 5/2008 Pennock et al. ............... 700/94
2001/0015124 A1 * 8/2001 Marinic et al. ................ 84/644
2003/0052728 A1 * 3/2003 Philpott ...................... 327/385
2004/0177746 A1 * 9/2004 Becker ........................ 84/612
2004/0258244 A1 12/2004 Haq et al.
2005/0089175 A1 * 4/2005 Van Tassel ................... 381/63
2006/0011052 A1 * 1/2006 Purchon et al. ............... 84/746

FOREIGN PATENT DOCUMENTS

JP 7-129172 5/1995
JP 9-034460 2/1997

OTHER PUBLICATIONS

Office Action dated Apr. 15, 2008 as issued from related Japanese Patent Application No. 2006-129396.

* cited by examiner

*Primary Examiner*—Marlon T Fletcher
(74) *Attorney, Agent, or Firm*—Foley & Lardner LLP

(57) ABSTRACT

The disclosure presented here involves an effect device that can easily connect with other effect devices in parallel. A preferred embodiment of this device is equipped with a number of components including an effect add means that adds effects, a mixing means that mixes the musical signals, a mode switching means that configures the operation from parallel mode to serial mode, and a phase reversal means that reverses the phase of the musical sound signals. Various combinations using the above means are possible and are presented in this disclosure. The output terminal outputs the musical sound signals that were selected, mixed, and or treated by the enabled features of the underlying embodiments.

22 Claims, 7 Drawing Sheets

EFFECT SYSTEM

CROSS-REFERENCE TO RELATED PATENT APPLICATIONS

The present invention relates to Japan patent application number 2006-129396, filed on May 8, 2006, which is incorporated herein by reference in its entirety.

BACKGROUND OF THE INVENTION

1. Field of the Invention

The present invention generally relates to the field of effect devices that can connect with other effect devices in parallel.

2. Related Art

Various types of effect devices (effectors) that add effects to input musical sound signals and then output the resulting sounds, have been known. Such effect devices include compact effectors which add different effects for the output of electric guitars equipped with pedal switch, or the multiple effector which can use a combination of multiple effects.

FIG. (Diagram) 7 is a block diagram that depicts an electrical configuration of a traditional Effect Device 30. This device has an input Jack JK 2; two amplifiers, AMP 1 and AMP 2; one Switch SW 1; an effect add circuit 2; and an output Jack JK 1. A plug on one end of a connecting cord for an electrical guitar, synthesizers, or the like may be inserted in the JK2 input Jack. Musical sound signals that are generated by sources such as an electric guitar or a synthesizer, are used as the input.

The musical sound signals that are input through the input Jack (JK 2), are provided to the effect add circuit 2, via the AMP 2 amplifier, and are connected to one side of the input terminal (1 Side of SW1 switch). The output of the effect add circuit 2 is connected to the other side of the input terminal (2 Side of Switch SW 1). The output terminal of Switch SW 1 may be connected to the output Jack JK 1, via AMP-1 Amplifier. The effect add circuit 2 can add several types of effects including a distortion group effect which distorts the music sound, and a resonance effect which reverberates or delays the musical sounds.

A plug on one end of a connecting cord that connects with the operating amplifier of a speaker (not shown on Diagrams) is inserted to output Jack JK 1. The SW 1 switch is equipped with foot pedals that a player can operate with his/her foot. The player can operate the foot pedals with his/her foot while he/she is playing guitar or synthesizer with both of his/her hands.

When Switch SW 1 is operated to connect with 1 Side, the input musical sound signals will be output from the output Jack (JK 1) without any effect. When the Switch SW1 is connected to Side-2, the effect add circuit 2 effects the input musical sound signals and the effected musical sound signals are output from the output Jack (JK 1).

Traditional effect devices such as the one explained above, are equipped with only one input jack and one output jack respectively. Such devices may be connected together in series, where an output of primary effect device is input on subsequent effect device. However, there can be difficulties in trying to achieve a parallel connection of such devices where musical sound signals are input to multiple effect devices and the output of the effect devices are mixed without one effect device becoming dominant over the other(s). A parallel connection implementation needed a means to separate musical sound signals on the input side of the effects devices, and a means to mix musical sound signals on the output side of the effects devices. The configuration of such a system has been known to be relatively complex. Serial connection has been an industry preference for this reason. When such devices are connected in series, the effect from a subsequent effect device tends to become dominant. For this reason it can be impossible to have certain desired effects with the serial connections of such prior devices.

SUMMARY OF THE DISCLOSURE

Embodiments of the present invention relate to an effect device that can easily connect with other effect devices in parallel. An effect device according to an embodiment of the present invention, inputs musical sound signals that are output from a send terminal, connects the input signals with a second effect device that adds another different effect, and connects the output of the second effect device with a return terminal. As a result, it is possible to add effects from both the primary effect device and the secondary effect device in parallel. The output terminal outputs musical sound signals that were mixed by a mixing means. An effect device according to an example embodiment of the invention is equipped with the following components:

1) an input terminal that inputs musical sound signals;
2) an effect add means that adds effects on the musical sound signals that were input on the input terminal;
3) an output terminal that outputs the musical sound signals that the effect add means has added its effect to;
4) a send terminal that outputs musical sound signals that were input on the input terminal;
5) a return terminal that inputs musical sound signals that are different from the one that were input on the input terminal; and
6) a mixing means that mixes musical sound signals that were input on the return terminal and the one that has effects by the effect deposit means.

In one embodiment, the effect device has an effect switching means that selects either the musical sound signals that were input on the input terminal or the musical sound signals that were mixed by the mix means. The output terminal then outputs the musical sound signals that were selected by the switching means. Therefore the device can select (1) the musical sound signals that are mixed by the mixing means, or the musical sound signals that have received effects from the internally-equipped effect add means and the externally-parallel-connected effect device, or (2) the musical sound signals that are input on the input terminal, or the musical sound signals without effect.

In another embodiment, an internal effect switching means selects to input the musical sound signals that obtained effect by the effect add means on the mixing means. In this manner, the device can select to have the internally-equipped effect add means apply the effect. In addition, it can have the externally-connected effects only.

The device can also be equipped with a mode switching means that configures either (1) the parallel mode, where the output terminal outputs the musical sound signals that were mixed by the mixing means, or (2) the series mode, wherein the send terminal outputs the musical sound signals that obtained effect by the effect add means, and the output terminal outputs the musical sound signals that were input on the return terminal. Therefore, the device can easily switch between (1) a mode where the effect from both effect add means and the externally-connected effect device are used in parallel and (2) a mode where the effect from both the effect add means and the externally-connected effect devices are used in series. The device can also be equipped with a mode switching means that configures either (1) a parallel mode, wherein the output terminal outputs the musical sound signals that were mixed by the mixing means, or (2) a series mode, wherein the send terminal outputs the musical sound signals that were input on the input terminal and the musical sound signals that were input on the return terminal are input on the effect add means, and then the output terminal outputs the musical sound signals that obtained effect by the effect add means.

Additionally in another embodiment each effect device enhanced with the following components can prevent different phases of the musical sound signals from offsetting each other and creating discomforting color of sound when the phase of the musical sound signals that are input on return terminal is reversed and mixed with the musical sound signals that were effected by the effect add means. This comprises of the following means:

1) A phase reversal means that reverses the phase of musical sound signals that were input on the return terminal; and 2) A reversal switching means that configures a phase reversal means to reverse the phase.

In one embodiment, the effect device operates with an Effect switching means that selects either the musical sound signals that were input on the input terminal, or it selects the musical sound signals that were effected when the switching means selected was in the series mode. The output terminal outputs the musical sound signals that were selected by the effect switching means. This way, in the series mode, the device can select between the unaffected musical sound signal and the effected musical sound signals. The selected signal is then outputted.

Similarly, the effect device can operate with an effect switching means that selects either the musical sound signals that were input on the input terminal or the musical sound signals that were mixed by the mixing means, when the mode switching means selected the parallel mode. The output terminal outputs the selected musical sound signals. In this manner, in parallel mode, the device can select between the unaffected musical sound signal that are input on the input terminal and the musical sound signals that are mixed by the mixing means. The selected signals are then outputted.

The effect devices can also contain an internal effect switching means that selects the effect add means to add effects, when the mode switching means has selected the series mode. This allows the device, in series mode, to bypass the internal effect add means and add the effect through the externally-connected effect device.

The effect devices can also contain an internal effect switching means that selects the effect add means for inputting the musical sound signals that obtained effect on the mixing means, when the mode switching means has selected the parallel mode. This allows the device, in parallel mode, to not add the effect by the internal effect add means, and add the effect through the externally-connected effect device.

In another embodiment of the invention, the switching means has a pedal switch so that the player can operate it with his/her foot.

DETAILED DESCRIPTION

Figure 1:
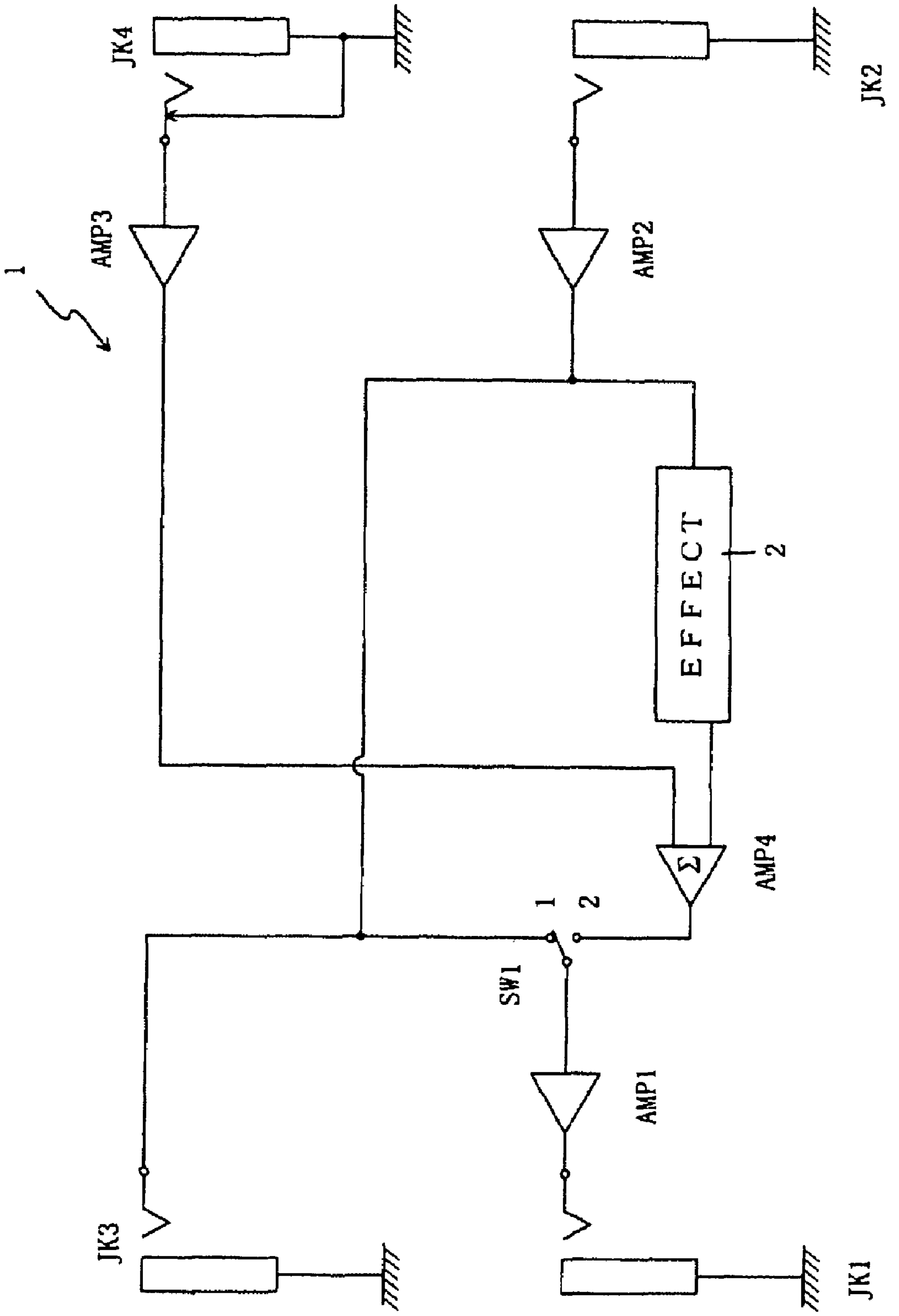
FIG. 1 is a block diagram of an electrical configuration of an effect device according to a first embodiment of the invention.

FIG. 1 is a block diagram that depicts the electrical configuration of an effect device 1 based on a first embodiment of the invention. The effect device 1 includes: Input Jack JK 2; Amplifier AMP 1; Amplifier AMP 2; Amplifier AMP 3; Amplifier AMP 4; Switch SW 1; Effect Add Circuit 2; Output Jack JK 1; Send Jack JK 3; and Return Jack JK 4.

Input Jack JK 2 may comprise a traditional device that receives a plug on one end of a connecting cord that connects with an electric guitar, synthesizer, or other suitable instruments, so that the musical sound signals from the electric guitar; synthesizer, or other suitable instruments will be inputted.

Amplifier AMP 1, Amplifier AMP 2, and Amplifier AMP 3 may be buffers. Amplifier AMP 4 mixes the musical sound signals that are input from two inputs, and outputs them. Effect Add Circuit 2, may be configured, for example like traditional devices, to give input musical sound signals such effects as distortion or delay.

The musical sound signals that are input from Input Jack JK 2, will be input to Effect Add Circuit 2 via Amplifier AMP 2, and connected with one end of input terminal (1 Side) of Switch SW 1, and Send Jack JK 3.

The musical sound signals that are output from the Effect Add Circuit 2, and that are output from Amplifier AMP 3 will be connected with input of Amplifier AMP 4, respectively. Then they will be mixed by Amplifier AMP 4 and connected with other end of input terminal (2 Side) of Switch SW 1. The output of Switch SW 1 will be connected with Output Jack JK 1 via Amplifier AMP 1.

When Switch SW 1 is operated to connect with 1 Side, input musical sound signals that are input from Input Jack JK 2 will be output on Output Jack JK 1 without any effect. When Switch SW1 is connected with 2 Side, the musical sound signals that obtained effect by Effect Add Circuit 2 and the musical sound signals that obtained effect by the externally-connected effect device that were input on Return Jack JK 4, are mixed by Amplifier AMP 4 and the mixed signals are output from Output Jack JK 1.

A plug on one end of a connecting cord that connects with a speaker operating amplifier (not shown on Figures), is inserted to Output Jack JK 1. Switch SW 1 may be connected to operate with a foot pedal that a player can operate with his/her foot, for example, while he/she is playing guitar or synthesizer. The Effect Add Circuit 2 may be powered by any suitable power source, including, but not limited to a connection to an AC source, a battery, or the like shown in the diagrams.

Figure 2:
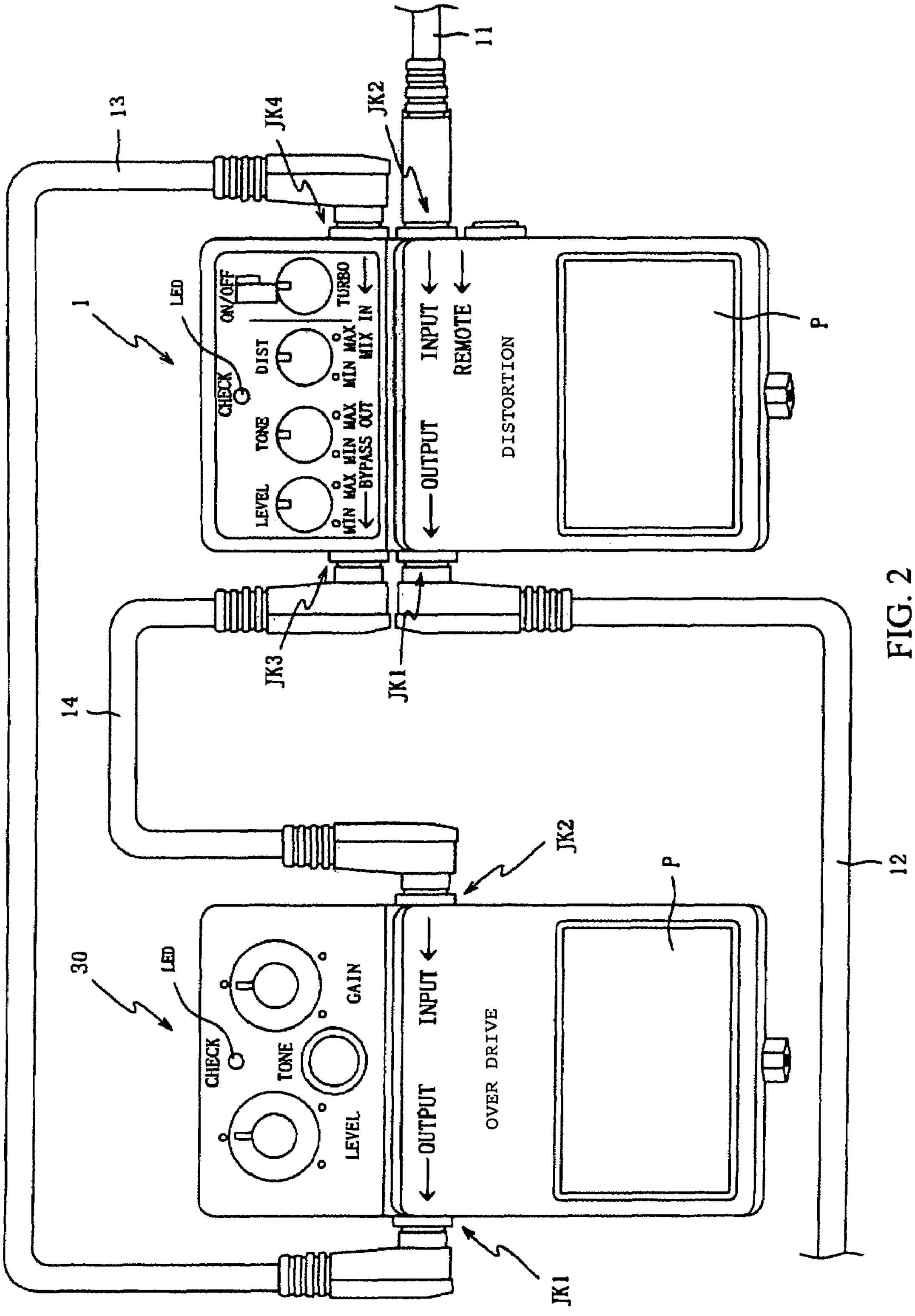
FIG. 2 is an external view of an effect device according to an embodiment of the invention and an externally-connected effect device.

FIG. 2 shows an external view of an effect device 1 according to an example embodiment of the invention and a traditional Effect Device 30. In the illustrated example, Effect Device 1 and Effect Device 30 are both devices that are commonly called compact effectors. As shown in Diagram 2, Send Jack JK 3 of Effect Device 1 and Input Jack JK 2 of Effect Device 30 are connected with each other through Connection Cord 14. Output Jack JK 1 of Effect Device 30 and Return Jack JK 4 of Effect Device 1 are connected with each other through Connection Cord 13. Input Jack JK 2 of Effect Device 1 is also connected with the Connection Cord 11 that may connect with an electric guitar, synthesizer or other suitable instrument. Output Jack JK 1 of Effect Device 1 is also connected with Connection Cord 12 that may connect with an amplifier that operates a speaker.

The top panel of each effect device is equipped with various control terminals, an LED, and a Pedal P. The Pedal P stays extended with a spring and is pivoted from a normal position upon being pushed down for example, by being stepped on with a player's foot. It is designed so that when the Pedal P is pushed down, the Switch SW 1 makes the toggle motion.

The LED is turned on when Panel P is operated to switch Switch SW 1 for outputting the musical sound signals that obtained the effect. And, the LED is turned off when the un-effected input musical sound signals are output. The control panel is equipped with multiple control terminals that configure the parameters when Effect Add Circuit 2 gives musical sound signals effect. Examples include a level control knob (LEVEL) that controls volume of output musical sound signals, and a tone control knob (TONE) that adjusts the frequency property of musical sound signals.

In this configuration, the Effect Device 1 adds a distortion effect; and the Effect Device 30 adds an over-drive effect. When the Pedal P of Effect Device 1 is configured to add an effect, the Effect Device 1 and the Effect Device 30 will be in parallel connection. Next, their input musical sound signals will be mixed with the effected musical sound signals of Effect Device 1 and Effect Device 30. The results will then be outputted.

Under this condition, when the Pedal P of the Effect Device 30 is configured to not have the Effect Device 30 add any effects, the sound signals that obtained effect of distortion by Effect Device 1 and the input sound signals are mixed and output.

As described above, parallel connections can be made between the externally-connected Effect Device 30 and the Effect Device 1. This can prevent subsequent devices from having the type of dominant effect that is otherwise present in traditional serial connections.

Figure 3:
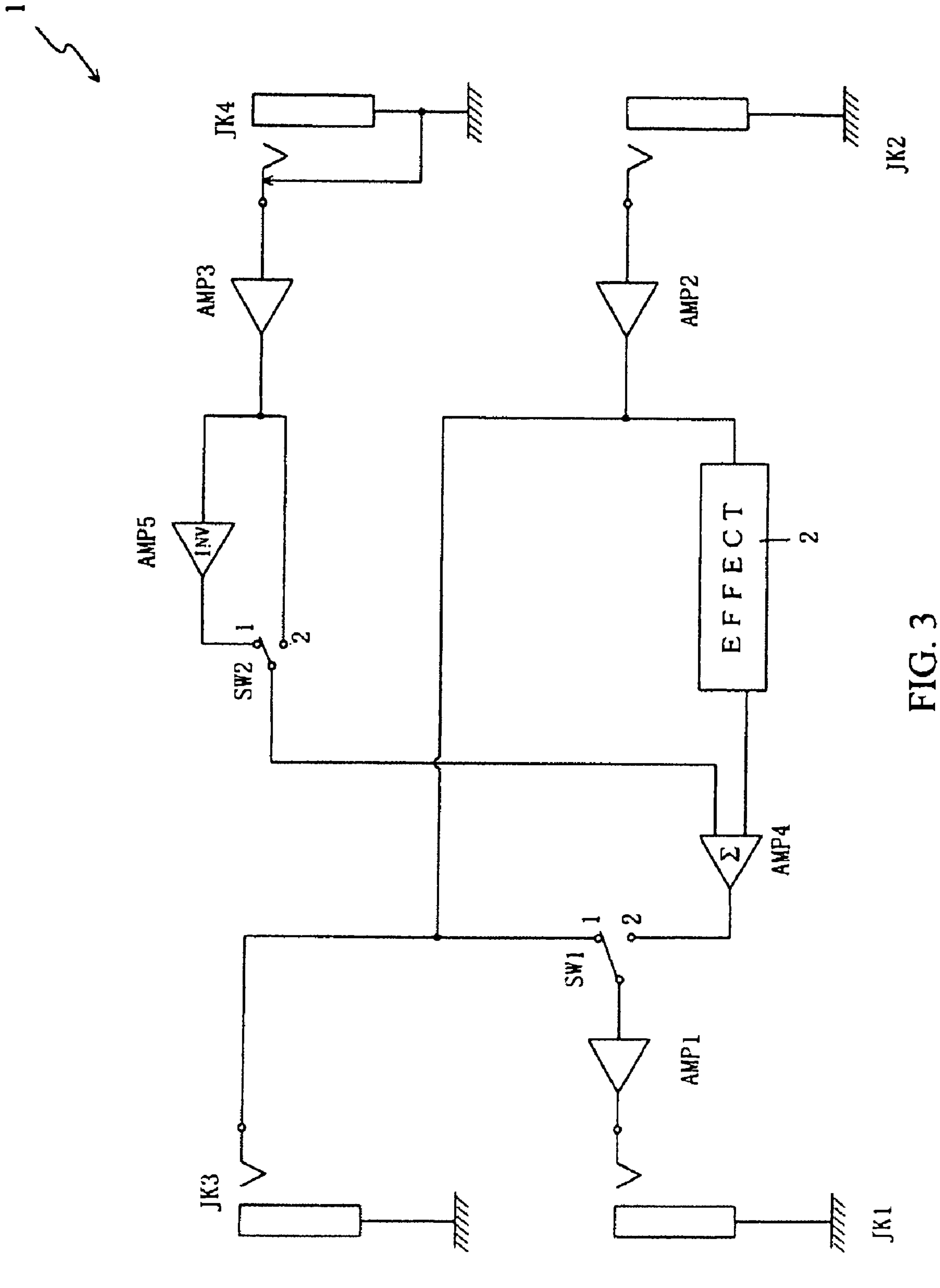
FIG. 3 is a block diagram of an electrical configuration of an effect device according to a second embodiment.

The second embodiment is described with FIG. 3. FIG. 3 shows a block diagram of an electrical configuration of an Effect Device 1 based on a second embodiment. In this figure, for those sections that are identical sections to the Effect Device 1 of the first embodiment, the same marks are used, and their descriptions are omitted. Only sections that are different from the previously presented embodiment are described.

As shown in FIG. 3, the main difference between this embodiment and the previous one is that the device is now equipped with an Amplifier AMP 5, and a Switch SW 2 for phase reversal between the Amplifier AMP 3 and Amplifier AMP 4.

The input of Return Jack JK 4 will be input to Amplifier AMP 3; Output of Amplifier AMP 3 will be connected with input of Amplifier AMP 5 (which is a reverse phase inverter of input signals), and the 2 Side of input terminal of Switch SW 2; Output of Amplifier AMP 5 will be connected with the 1 Side of input terminal of Switch SW 2; and the Output terminal of Switch SW 2 will be connected with the other input of the Amplifier AMP 4.

The phase of the musical sound signals that are input from the externally-parallel-connected effect devices via the Return Jack JK 4, is sometimes reversed against the phase of the musical sound signals that obtained effect from the Effect Add Circuit 2. In this case, the musical sound signals offset each other and create an unintended color of sound. In order to avoid this situation, this device is equipped with Amplifier AMP 5, which is an inverter, and a Switch SW 2 that can select either the musical sound signals whose phase is reversed or the musical sound signals whose phase is not reversed. Player can try to sample the mixed musical sound. If the mixed musical sound has an unintended color of sound, a player can then turn a Switch SW 2 to configure to a normal color of sound. Switch SW 2 is formed with a toggle switch or a slide switch on the control panel.

Figure 4:
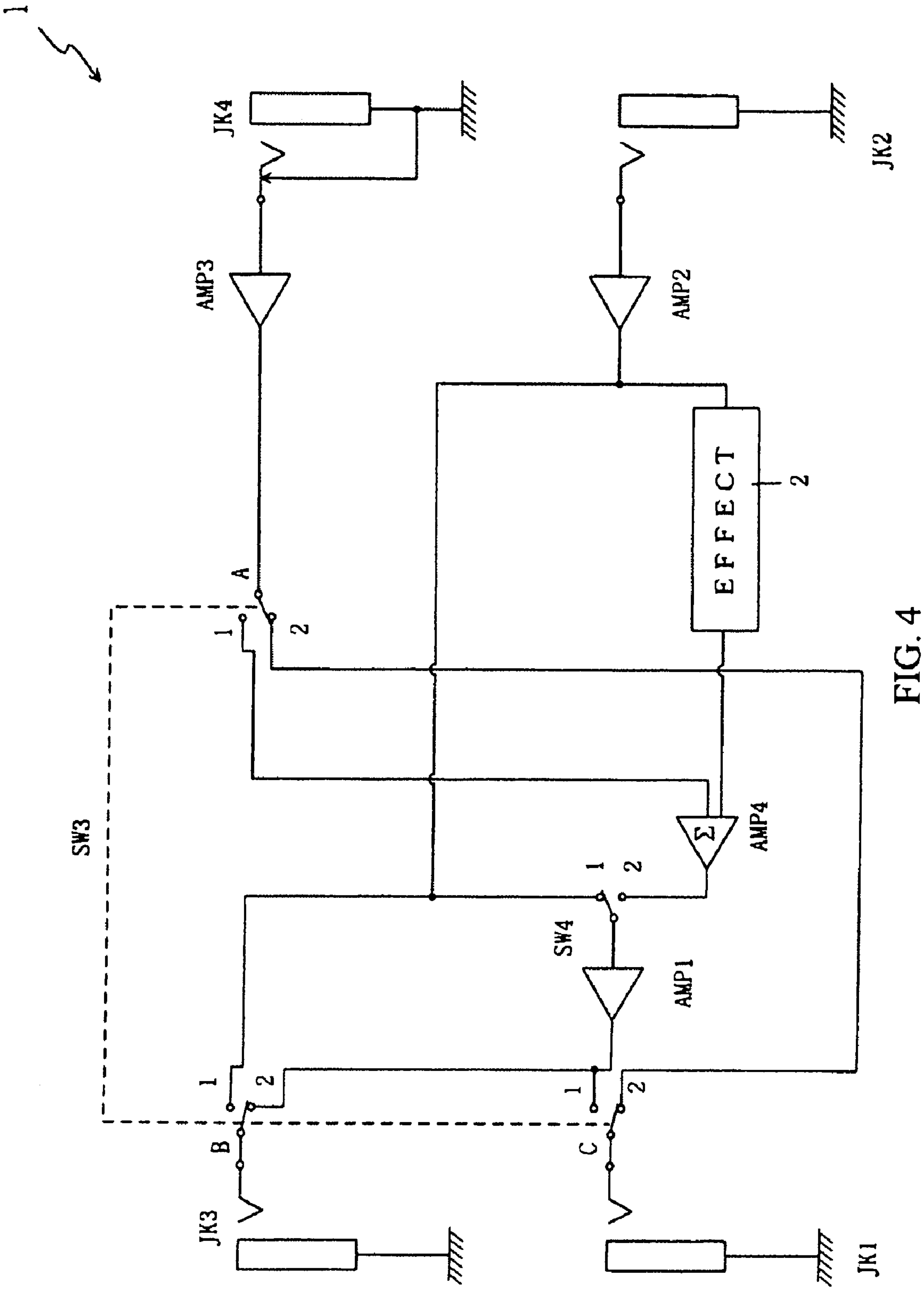
FIG. 4 is a block diagram of an electrical configuration of an effect device of a third embodiment.

FIG. 4 refers to a block diagram that shows an electrical configuration of an Effect Device 1 according to a third embodiment. In this figure, for those sections of Effect Device 1 that are identical to the first embodiment presented, the same marks as before are placed and their corresponding descriptions, are omitted. Only sections that are different from the previous embodiments are described. In the first embodiment, the device was connected in parallel with the externally-connected Effect Device 30. The device can now select to connect with the Effect Device 30 either in parallel or in serial using a switch.

As shown in FIG. 4, Effect Device 1 of the third embodiment is equipped with Switch SW 3 that can switch three circuits (Circuit A, B, and C) all at the same time. Circuit A selects the musical sound signals that are input from Return Jack JK 4 and output from Amplifier AMP 3, to connect to either the input of Amplifier AMP 4 (1 Side) or to the Terminal 2 of Circuit C which then switches the connection with the Output Jack JK 1 (2 Side).

Circuit B selects the output of Jack JK 3 to be either the musical sound signals that were the input of the Input Jack JK 2 and the output of the Amplifier AMP 2 (1 Side), or the musical sound signals that were output to Amplifier AMP 1 (2 Side). Circuit C switches the connection for Output Jack JK 1, and selects either the musical sound signals that were output from the Amplifier AMP 1 (1 Side), or the musical sound signals that are inputted from Return Jack JK 4 which are connected with Terminal 2 of Circuit A and are outputted from Amplifier AMP 3 (2 Side).

Switch SW 4 switches between the musical sound signals that are input on the Input Jack JK 2 and the musical sound signals that are output from the Amplifier AMP 4, and outputs the musical sound signals to Amplifier AMP 1. It can be switched by controlling Pedal P. Switch SW 3 is formed with a toggle switch or a slide switch on control panel.

Chart 1 shows how the effect is configured by Switch SW 3 and Switch SW 4.

CHART 1

| | SW 4 | |
|---|---|---|
| SW 3 | 1 | 2 |
| 1 | Direct Sound | Parallel |
| 2 | Only valid with external device | Series (In → Internal → External → Out) |

As shown in Chart 1, when the Switch SW 3 is configured to 1 Side and the Switch SW 4 is configured to 1 Side, the input musical sound signals are directly output from Input Jack JK 2 to Output Jack JK 1. When Switch SW 4 is configured to 2 Side, it becomes a parallel connection, where the internal Effect Add Circuit 2 and the externally-connected Effect Device 30 add effects.

When, on the other hand, Switch SW 3 is configured to 2 Side and Switch SW 4 is configured to 1 Side, the internal Effect Add Circuit 2 will be bypassed and the signals will be output on Send Jack JK 3, and only the externally-connected Effect Device 30 will add effects. When Switch SW 4 is configured to 2 Side, it becomes serial connection, where the internal Effect Add Circuit 2 first adds effect and then externally-connected Effect Device 30 adds effects.

In other words, when Switch SW 4 is configured to 2 Side and Switch SW 3 is configured to 1 Side, musical sound signals that were input on Input Jack JK 2 will be inputted on Effect Add Circuit 2 via Amplifier AMP 2, and are outputted from Send Jack JK 3 via Switch SW 4. The externally-connected Effect Device 30 inputs the musical sound signals that were output from this Send Jack JK 3, applies effect on the musical signals, and then returns them to Return Jack JK 4.

Musical sound signals that were input on Return Jack JK 4 will be input on the one input of Amplifier AMP 4 via Amplifier AMP 3. Musical sound signals that obtained effect from Effect Add Circuit 2 will be input on the other input of Amplifier AMP 4 and then get mixed. Musical sound signals that were mixed by Amplifier AMP 4 will be output from the Output Jack JK 1 via Amplifier AMP 1. Therefore in this case, external Effect Device 30 will be in parallel connection.

When Switch SW 3 is configured to 2 Side, and Switch SW 4 is configured to 2 Side the musical sound signals that were input on Input Jack JK 2 will be input on Effect Add Circuit 2 via Amplifier AMP 2, and the musical sound signals that obtained effect from Effect Add Circuit 2 will be output from Send Jack JK 3 via Amplifier AMP 4 and Amplifier AMP 1. Externally-connected Effect Device 30 inputs the musical sound signals that are output from the Send Jack JK 3, gives them effect, and then returns them to Return Jack JK 4.

Musical sound signals that were input on Return Jack JK 4 will be output from Output Jack JK 1 via Amplifier AMP 3. Therefore in this case, the External Effect Device 30 will be in serial connection. Thus, when Switch SW 4 is configured to 2 Side, the device can switch the connection of externally-connected effect device 30 from serial connection to parallel using Switch SW 3.

On the other hand, when Switch SW 4 is configured to the 1 Side, and Switch SW 3 is configured to the 1 Side, or to the parallel connection, then the musical sound signals that were input on Input Jack JK 2 will be output from Output Jack JK 1 via Amplifier AMP 2 and Amplifier AMP 1 without any effect. When Switch SW 4 is configured to the 1 Side, and Switch SW 3 is configured to the 2 Side (as shown in Diagram 4), the musical sound signals that were input on Input Jack JK 2 will be output from the Send Jack JK 3 via Amplifier AMP 2 and Amplifier AMP 1. The musical sound signals that obtained effect by the externally-connected Effect Device 30 will be input on Return Jack JK 4, and the signals will be output from Output Jack JK 1 via Amplifier AMP 3. Therefore in this case, only externally-connected Effect Device 30 adds effect.

As we described based on the third embodiment above, equipping with Switch SW 3, enables the device to switch between parallel connection and serial connection without requiring any changes to be made to the wiring of the externally-connected Effect Device 30.

Figure 5:
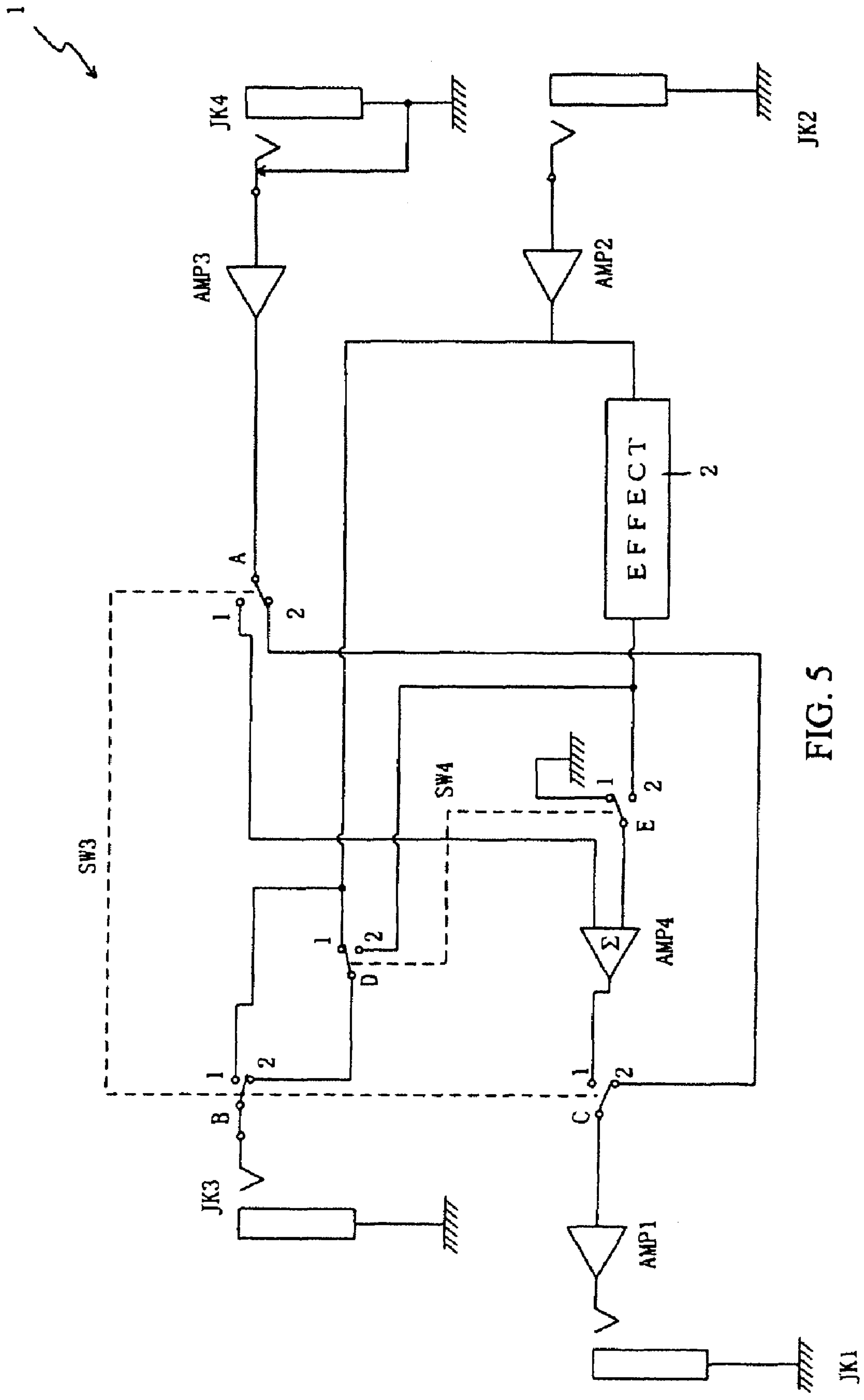
FIG. 5 is a block diagram of an electrical configuration of an effect device of a fourth embodiment.

FIG. 5 refers to a block diagram that shows an electrical configuration of an Effect Device 1 based on a fourth embodiment. Again for those sections that are identical with the Effect Device 1 of the previously presented embodiments, the descriptions are omitted and same marks are used. Only the sections that are different from the previous embodiments are described.

In a third embodiment, Switch SW 4 enables the device bypass the internal Effect Add Circuit 2 so that only the externally-connected Effect Device 30 adds effect under a series mode and then directly outputs the musical sound signals that were input on Input Jack JK 2 under parallel mode.

In this fourth embodiment, when the internal Effect Add Circuit 2 does not add effect with switching Switch SW 4, the device can have only the externally-connected Effect Device 30 add effect, regardless of the series mode or the parallel mode.

In this embodiment, the device is equipped with Switch SW 4 which switches two circuits (Circuit D and E) at the same time. Circuit D switches the connection with Send Jack JK 3 between (1) the musical sound signals that were input from the input jack and that were output from Amplifier AMP 2 (1 Side), and (2) the musical sound signals that obtained effect from Effect Add Circuit 2 (2 Side) when series mode is selected. Circuit E switches the other input of Amplifier AMP 4 between (1) ground (1 Side) and (2) musical sound signals that obtained effect from Effect Add Circuit 2 (2 Side). Chart 2 shows how effect is configured by switch SW 3 and switch SW 4.

CHART 2

| | SW 4 | |
|---|---|---|
| SW 3 | 1 | 2 |
| 1 | Only valid with external | Parallel |
| 2 | Only valid with external | Series<br>(In → Internal → External → Out) |

As shown in Chart 2, when Switch SW 3 is configured to 1 Side and Switch SW 4 is configured to 1 Side, musical sound signals that were input on Input Jack JK 2 will be output on Send Jack JK 3, and only externally-connected Effect Device 30 adds effect. When Switch SW 4 is configured to 2 Side, it becomes parallel connection, where internal Effect Add Circuit 2 and externally-connected Effect Device 30 add effects.

On the other hand, when Switch SW 3 is configured to 2 Side, and when Switch SW 4 is configured to 1 Side, internal Effect Add Circuit 2 will be bypassed and the signals will be Sent to Jack JK 3, and the only the externally-connected Effect Device 30 adds them effect. When Switch SW 4 is configured to 2 Side, it becomes serial connection, where the internal Effect Add Circuit 2 first adds an effect and then the externally-connected Effect Device 30 adds an effect.

In other words, when Switch SW 3 is switched to 1 Side and when parallel mode is selected, and when Switch SW 4 is switched to 1 Side, Circuit E shuts off output of the Effect Add Circuit 2, and then the externally-connected Effect Device 30 inputs only musical sound signals that obtained effect on Amplifier AMP 4. When Switch SW 4 is switched to 2 Side, output of Effect Add Circuit 2 will be input on Amplifier AMP 4, which makes it a parallel connection.

When Switch SW 3 is switched to 2 Side, and when series mode is selected, and when Switch SW 4 is switched to 1 Side, Circuit D lets the musical sound signals that were input on Input Jack JK 2 be output from Send Jack JK 3. The musical sound signals that obtained effect only from the externally-connected Effect Device 30 will be input on Return Jack JK 4, and are output from Output Jack JK 1 via Amplifier AMP 3 and Amplifier AMP 1. When Switch SW 4 is switched to 2 Side, Send Jack JK 3 will be supplied with the musical sound signals that obtained effect from Effect Add Circuit 2, and then the externally-connected Effect Device 30 adds further effects. The signals will be input on. Return Jack JK 4, and then output from the Output Jack JK 1 via Amplifier AMP 3 and Amplifier AMP 1.

Therefore, in the fourth embodiment, the device can configure to add effect only from externally-connected Effect Device 30 regardless of series mode, or parallel mode by switching SW4.

Figure 6:
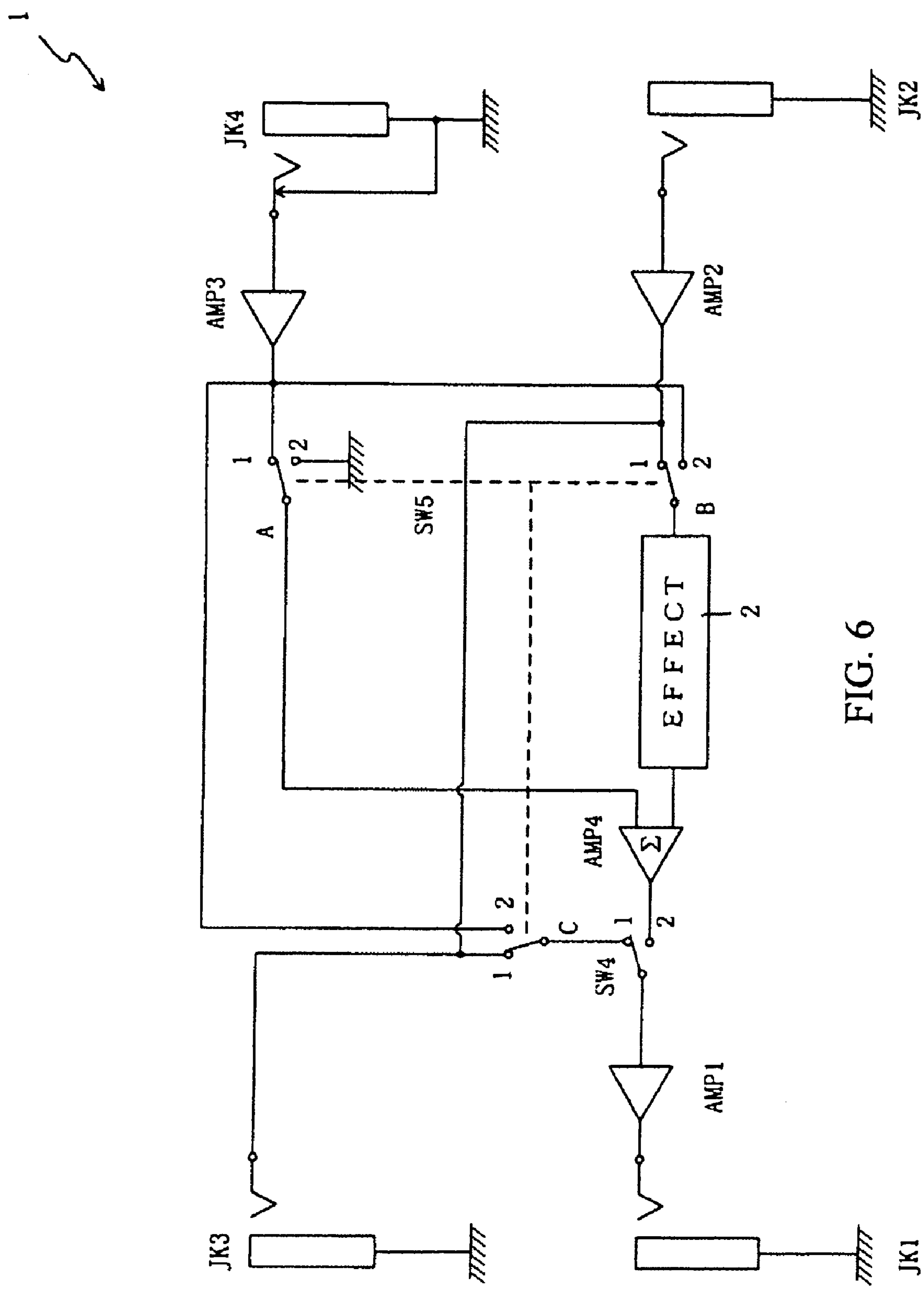
FIG. 6 is a block diagram of an electrical configuration of an effect device of a fifth embodiment.
Figure 7:
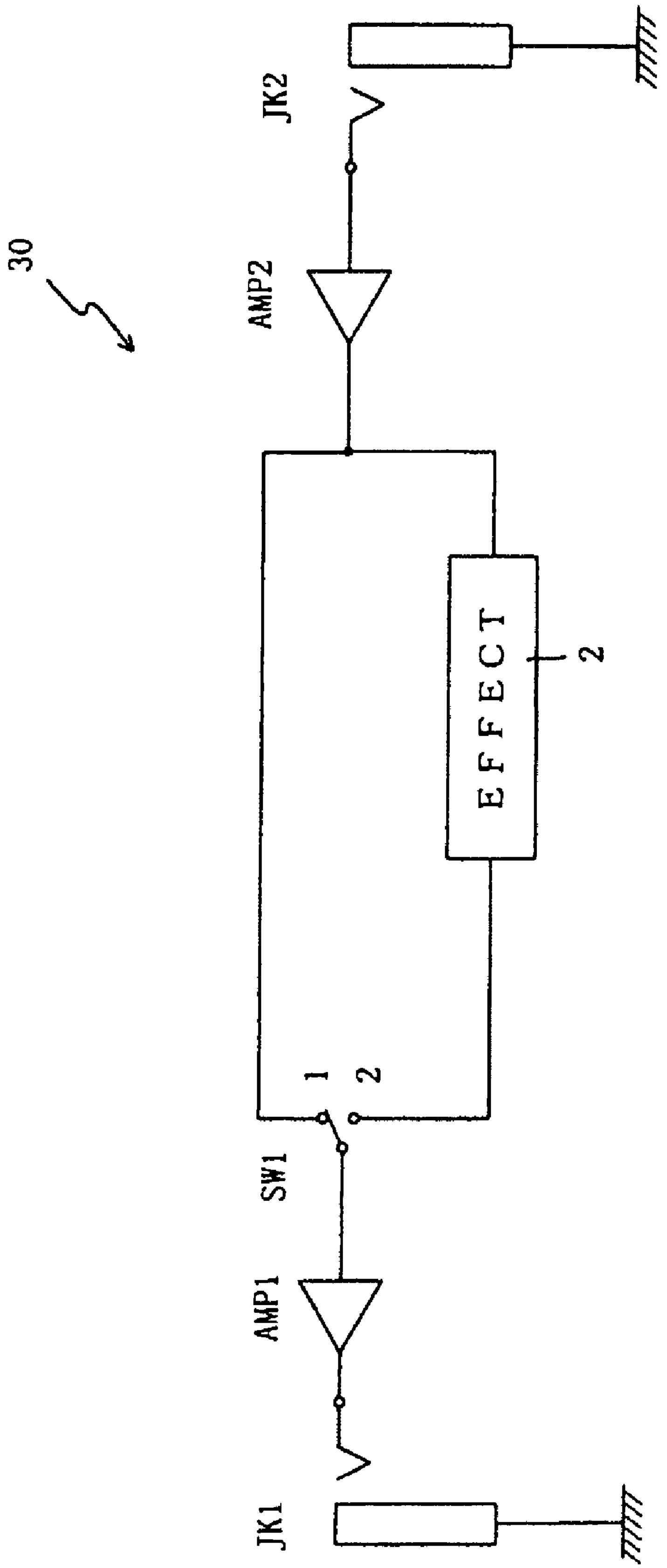
FIG. 7 is a block diagram of an electrical configuration of a traditional effect device.

FIG. 6 refers to a block diagram that shows an electrical configuration of Effect Device 1 of a fifth embodiment. As before, for those sections identical to the Effect Device 1 of previous embodiments, the same marks are used and their descriptions are omitted. Only the sections that are different from the previous embodiments are described.

In the third and fourth embodiments previously presented, the device could switch between series mode and parallel mode. In the series mode, first the internal Effect Add Circuit 2 gave an effect, and then the externally-connected Effect Device 30 gave an effect. In the fifth embodiment presented here, the device can similarly switch between series mode and parallel mode. In series mode, the externally-connected Effect Device 30 first adds the signals effect, and then the internal Effect Add Circuit 2 adds effect.

As shown in FIG. 6, Send Jack JK 3 is connected with the output of Amplifier AMP 2, and the musical sound signals that were input on Input Jack JK 2 will be constantly supplied. Switch SW 5 that switches between series mode and parallel mode switches 3 circuits (Circuit A, B, and C) all at the same time.

Circuit A switches one input of Amplifier AMP 4 between (1) musical sound signals that were input on Return Jack JK 4 and then came via Amplifier AMP 3 (1 Side) and (2) the ground (2 Side). Circuit B switches input of Effect Add Circuit 2 between (1) musical sound signals that were input on Input Jack JK 2 and then came via Amplifier AMP 2 (1 Side) and (2) musical sound signals that were input on Return Jack JK 4 and then came via Amplifier AMP 3 (2 Side). Circuit C switches the contact point of the 1 Side of Switch SW 4 between (1) musical sound signals that were input on Input Jack JK 2 and then came via Amplifier AMP 2 (1 Side) and (2) musical sound signals that were input on Return Jack JK 4 and then came via Amplifier AMP 3 (2 Side).

Switch SW 4 switches signals that are output from Output Jack JK 1 via Amplifier AMP 1 between (1) the musical sound signals that were selected by Circuit C of Switch SW 5 (1 Side) and (2) the musical sound signals that were mixed by Amplifier AMP 4 (2 Side).

Chart 3 shows how the effect is configured by Switch SW 4 and Switch SW 5.

CHART 3

| | SW 4 | |
|---|---|---|
| SW 5 | 1 | 2 |
| 1 | Direct Sound | Parallel |
| 2 | Only valid with external | Series (In → External → Internal → Out) |

As shown in Chart 3, when Switch SW 5 is configured to 1 Side and Switch SW 4 is configured to 1 Side, musical sound signals that were input on Input Jack JK 2 will be directly output on Output Jack JK 1. When Switch SW 4 is configured to 2 Side, both the internal Effect Add Circuit 2 and the externally-connected Effect Device 30 add the signals effects. This makes it parallel connection.

On the other hand, when Switch SW 5 is configured to 2 Side and Switch SW 4 is configured to 1 Side, the internal Effect Add Circuit 2 will be bypassed and musical sound signals that were input on Input Jack JK 2 will be output on Send Jack JK 3 via Amplifier AMP 2, and only the externally-connected Effect Device 30 adds the signals effect. When Switch SW 4 is configured to 2 Side, the externally-connected Effect Device 30 first adds the signals effect, and then the internal Effect Add Circuit 2 adds the effect. This makes it serial connection.

In other words, when Switch SW 4 is configured to 2 Side and Switch SW 5 is configured to 1 Side (parallel mode), the musical sound signals that were input on Input Jack JK 2 will be output from the Send Jack JK 3 via Amplifier AMP 2, and then will be inputted on the internal Effect Add Circuit 2 via Circuit B. The musical sound signals that obtained effect from the internal Effect Add Circuit 2 will then be inputted on one end of Amplifier AMP 4. The musical sound signals that were input on Return Jack JK 4 will be inputted on other end of Amplifier AMP 4 via Amplifier AMP 3 and Circuit A. These signals will be mixed by Amplifier AMP 4 and will be outputted from Amplifier AMP 1.

On the other hand, when Switch SW 5 is switched as 2 Side (series mode), musical sound signals that were input on Input Jack JK 2 will be first output from Send Jack JK 3 via Amplifier AMP 2 and then the musical sound signals that were input on Return Jack JK 4 will be input on the internal Effect Add Circuit 2 via Amplifier AMP 3 and Circuit B. One input of Amplifier AMP 4 will be connected with ground via Circuit A. Output of Effect Add Circuit 2 will be input on its other end. External Effect Device 30 first adds the signals effect and then the musical sound signals that obtained effect from internal Effect Add Circuit 2 will be output from the Output Jack JK 1.

When Switch SW 4 is configured to 1 Side, in parallel mode, the musical sound signals that were input on Input Jack JK 2 will be output from Output Jack JK 1 via Circuit C. In series mode, only externally-connected Effect Device 30 adds the signals effect.

This concludes our description of the Invention based on the embodiments. The application of the Invention, however, should not be limited by the embodiments, and it is easy to assume that various modifications can be applied as long as they will not deviate from the point of the Invention.

For example, we omitted the description of the internal configuration of the Effect Add Circuit 2 in the above embodiments. We can use an analog circuit or DSP (Digital Signal Processor) that converts analog musical sound signals to digital signals with a fixed sampling frequency to add effects.

We assumed Send Jack JK 3 and Return Jack JK 4 would be independent monaural jacks in the above embodiments. For example, we can configure stereo jack such as send jack to be the left channel, and return jack to be the right channel. This simplifies the jack configuration and leads to not only to a reduction in manufacturing cost but also makes the connection task easy for users.

In the first embodiment, Switch SW 1 was assumed to select outputs of Amplifier AMP 2 and Amplifier AMP 4. We can connect the output of Amplifier AMP 4 and the input of Amplifier AMP 1, and configure Switch SW 1 to select the connection for the output of Amplifier AMP 2 to be either (1) Effect Add Circuit 2 and send jack or (2) input of Amplifier AMP 1.

In a third and fourth embodiments, in series mode, we assumed that internal Effect Add Circuit 2 would first add the signals effect and then the externally-connected Effect Device 30 would add effect. In a fifth embodiment, we assumed that the externally-connected Effect Device 30 would add the signals effect and then the internal Effect Add Circuit 2 would add effect. We can add a new switch to select either (1) having the internal Effect Add Circuit 2 to add an effect followed by the externally-connected Effect Device 30 adding another effect or (2) having the externally-connected Effect Device 30 first adding an effect followed by the internal Effect Add Circuit 2 adding an effect.

In the above embodiments, we assumed that Switch SW 4 would be switched by a pedal operation, and that Switch SW 3 (Switch SW 5) would be equipped on control panel. We can equip the two pieces of Pedal P to make them switch with foot operation only.

What is claimed is:

1. An effect device comprising:

an input terminal that inputs musical sound signals;

an effect add means that adds effects on the musical sound signals that were input on the input terminal;

an output terminal that outputs the musical sound signals that the effect add means has added its effect to;

a send terminal that outputs the musical sound signals that were input on the input terminal;

a return terminal that inputs musical sound signals that are different from the ones that were input on the input terminal;

a mixing means that mixes the musical sound signals that were input on the return terminal and the ones that obtained effects by the effect add means; and wherein the output terminal outputs the musical sound signals that were mixed by the mixing means.

2. The device of claim 1, comprising:

an effect switching means that selects the musical sound signals that were either input on the input terminal or were mixed by the mixing means; and wherein the output terminal outputs the musical sound signals that were selected by the effect switching means.

3. The device of claim 2, wherein the effect switching means has a pedal switch.

4. The device of claim 1, comprising:

an internal effect switching means that selects to input the musical sound signals that obtained effect by the effect add means on the mixing means.

5. The device of claim 4, wherein the internal effect switching means has at least one pedal switch.

6. The device of claim 1, comprising:

a mode switching means that configures either (1) a parallel mode, wherein the output terminal outputs the musical sound signals that were mixed by the mixing means, or (2) a series mode, wherein the send terminal outputs the musical sound signals that obtained effect by the effect add means; and the output terminal outputs the musical sound signals that were input on the return terminal.

7. The device of claim 1, comprising:

a mode switching means that configures either (1) a parallel mode, wherein the output terminal outputs the musical sound signals that were mixed by the mixing means, or (2) a series mode, wherein the send terminal outputs the musical sound signals that were input on the input terminal and the musical sound signals that were input on the return terminal are input on the effect add means, and then the output terminal outputs the musical sound signals that obtained effect by the effect add means.

8. The device of claim 1, comprising:

a) a phase reversal means that reverses the phase of the musical sound signals that were input on the return terminal; and b) a reversal switching means that configures the phase reversal means to reverse the phase.

9. The device of claim 6, comprising:

an effect switching means that selects either the musical sound signals that were input on the input terminal or the musical sound signals that obtained effect, when the mode switching means selected the series mode; and wherein the output terminal outputs the musical sound signals that were selected by the effect switching means.

10. The device of claim 7, comprising:

an effect switching means that selects either the musical sound signals that were input on the input terminal or the musical sound signals that obtained effect, when the mode switching means selected the series mode; and wherein the output terminal outputs the musical sound signals that were selected by the effect switching means.

11. The device of claim 6, comprising:

an effect switching means that selects either the musical sound signals that were input on the input terminal or the musical sound signals that were mixed by the mixing means, when the mode switching means selected the parallel mode; and wherein the output terminal outputs the musical sound signals that were selected by the effect switching means.

12. The device of claim 7, comprising:

an effect switching means that selects either the musical sound signals that were input on the input terminal or the musical sound signals that were mixed by the mixing means, when the mode switching means selected the parallel mode; and wherein the output terminal outputs the musical sound signals that were selected by the effect switching means.

13. The device of claim 6, further comprising an internal effect switching means that selects the effect add means to add effects, when the mode switching means selects the series mode.

14. The device of claim 7, further comprising an internal effect switching means that selects the effect add means to add effects, when the mode switching means selects the series mode.

15. The device of claim 6, further comprising an internal effect switching means that selects the effect add means to input the musical sound signals that obtained effect on the mixing means, when the mode switching means selected the parallel mode.

16. The device of claim 7, further comprising an internal effect switching means that selects the effect add means to input the musical sound signals that obtained effect on the mixing means, when the mode switching means selected the parallel mode.

17. The device of claim 1, wherein the effect device is a compact pedal effect device.

18. The device of claim 1, wherein the musical sound signals input on the return terminal are based at least in part on the musical sound signals output by the send terminal.

19. The device of claim 1, the send terminal configured to output the musical sound signals to an external effect device for adding an effect to the musical sound signals output by the send terminal; and the return terminal configured to input the musical sound signals to which the external effect device has added an effect.

20. The device of claim 19, the effect adding means configured to add an effect to the musical sound signals input on the input terminal in parallel with the external effect device adding an effect to the musical sound signals output by the send terminal.

21. An effect device comprising:

an input terminal that inputs musical sound signals;

an effect add means that adds effects on the musical sound signals that were input on the input terminal;

an output terminal that outputs the musical sound signals that the effect add means has added its effect to;

a send terminal that outputs the musical sound signals that were input on the input terminal;

a return terminal that inputs musical sound signals that are different from the musical sound signals that were input on the input terminal;

a mixing means that mixes the musical sound signals that were input on the return terminal and the musical sound signals that obtained effects by the effect add means; and a mode switching means that configures either (1) a parallel mode, wherein the output terminal outputs the musical sound signals that were mixed by the mixing means, or (2) a series mode, wherein the send terminal outputs the musical sound signals that obtained effect by the effect add means; and the output terminal outputs the musical sound signals that were input on the return terminal.

22. An effect device comprising:

an input terminal that inputs musical sound signals;

an effect add means that adds effects on the musical sound signals that were input on the input terminal;

an output terminal that outputs the musical sound signals that the effect add means has added its effect to;

a send terminal that outputs the musical sound signals that were input on the input terminal;

a return terminal that inputs musical sound signals that are different from the musical sound signals that were input on the input terminal;

a mixing means that mixes the musical sound signals that were input on the return terminal and the musical sound signals that obtained effects by the effect add means; and a mode switching means that configures either (1) a parallel mode, wherein the output terminal outputs the musical sound signals that were mixed by the mixing means, or (2) a series mode, wherein the send terminal outputs the musical sound signals that were input on the input terminal and the musical sound signals that were input on the return terminal are input on the effect add means, and then the output terminal outputs the musical sound signals that obtained effect by the effect add means.

* * * * *